United States Patent [19]
Rey et al.

[11] Patent Number: 5,405,429
[45] Date of Patent: Apr. 11, 1995

[54] METHOD FOR TREATMENT AND CONVERSION OF REFUSE INCINERATION RESIDUES INTO ENVIRONMENTALLY ACCEPTABLE AND REUSABLE MATERIAL, ESPECIALLY FOR CONSTRUCTION PURPOSES

[75] Inventors: Theo Rey, Aarau; Alfred Edlinger, Baden, both of Switzerland

[73] Assignee: Holderbank Financière Glarus, AG, Glarus, Switzerland

[21] Appl. No.: 60,566

[22] Filed: May 12, 1993

[30] Foreign Application Priority Data

May 12, 1992 [CH] Switzerland .................. 1519/92

[51] Int. Cl.$^6$ ............................................. C21B 11/00
[52] U.S. Cl. ......................................... 75/434; 588/201
[58] Field of Search ........................... 75/434; 588/201

[56] References Cited

U.S. PATENT DOCUMENTS 3,779,182 12/1973 Camacho .................. 110/8 R

FOREIGN PATENT DOCUMENTS

| | | |
|---|---|---|
| 87448 | 2/1922 | Austria . |
| 437679 | 7/1991 | European Pat. Off. . |
| 0453904 | 10/1991 | European Pat. Off. . |
| 395958 | 3/1924 | Germany . |
| 1471529 | 4/1969 | Germany . |
| 1508003 | 10/1969 | Germany . |
| 1937048 | 7/1970 | Germany . |
| 2307237 | 9/1973 | Germany . |
| 2308851 | 5/1974 | Germany . |
| 2728289 | 12/1977 | Germany . |
| 2747957 | 5/1978 | Germany . |
| 2829370 | 1/1979 | Germany . |
| 3207203 | 8/1983 | Germany . |
| 3608005 | 10/1987 | Germany . |
| 3934611 | 4/1991 | Germany . |
| 9102824 | 3/1991 | WIPO ................. 588/201 |

OTHER PUBLICATIONS

J. J. J. M. Goumans et al., "Waste Materials in Construction"; Proceedings of the International Conference on Environmental Implications of Construction with Waste Materials, 1991, Elsevier, Amsterdam, NL; pp. 513–522.

*Primary Examiner*—Melvyn J. Andrews
*Attorney, Agent, or Firm*—C. Hildebrand; EGLI International

[57] ABSTRACT

In the processing of mainly inorganic refuse incineration products polluted by heavy metals and/or heavy metal compounds, and/or analogues of such products, to give environmentally acceptable products by melt-thermal treatment, an iron-containing melt is used whose iron content can be adjusted by addition of iron or an iron compound. The melt is first melted above 1300° C. in a reactor. The melt is then oxidized with vigorous agitation by blowing in oxygen-containing gas until all the metals and metal compounds present in the reactor have been converted to the oxide form, the melt being kept above 1450° C. and preferably at about 1500° C., at least at the end of the oxidation. Subsequently, the melt is reduced, preferably by means of a part fraction of the refuse incineration product and/or iron, preferably in the form of scrap, and/or hydrogen. The reduction can then be continued by means of added aluminum and/or calcium and/or ferrosilicon. If appropriate, metal melt is fractionated in a lower part of the reactor and slag melt is separately collected as a supernatant layer. Heating energy can be saved by heat exchange and recirculation of fluid.

15 Claims, 2 Drawing Sheets

METHOD FOR TREATMENT AND CONVERSION OF REFUSE INCINERATION RESIDUES INTO ENVIRONMENTALLY ACCEPTABLE AND REUSABLE MATERIAL, ESPECIALLY FOR CONSTRUCTION PURPOSES

FIELD OF INVENTION

The invention relates to a method for treatment or processing mainly inorganic refuse incineration products polluted by heavy metals and/or heavy metal compounds, and/or analogues of such products, to convert it into environmentally acceptable products by melting and melt-thermal treatment of these refuse incineration products and/or analogues in a reactor, if appropriate after drying and/or preheating thereof,
volatile metals and metal compounds escaping in a gas phase and then being precipitated and/or washed out of the latter,
compounds of metallic elements being reduced until at least all metallic elements which are more electropositive than iron are converted from the oxide form to the metal,
iron and metals soluble in iron being collected in the reactor in an iron melt, elements and compounds which are insoluble in iron being collected in a slag melt in the reactor above the iron melt and/or in at least one heavy metal melt below the iron melt and then being separated from the iron melt and the molten slag taken off from the reactor being quenched in order to obtain pozzolana reaction properties or hydraulic reaction properties.

BACKGROUND OF THE INVENTION

Examples of the said refuse incineration products, whose processing can be carried out by the method according to the invention, are grate throw-off, siftings, grate slag, fly dust, filter dust, residue from flue gas purification and/or analogous residues from refuse incineration.

In this connection, it is pointed out that, as used in this specification, the word "refuse" has the same meaning as the word "waste" which is commonly used in some areas in place of the word "refuse".

Examples of the said analogues, whose processing can be carried out by the method according to the invention, are slags, ashes, dusts, contaminated materials, spent catalysts, used glass, foundry sands, scrap metals and the like, whose chemical composition and properties are similar to those of refuse incineration products with respect to their hazard potential for the environment.

A process of the type described at the outset is known from the article by F. J. M. Lamers et al. "Production and Application of a Useful Slag from Inorganic Waste Products with a Smelting Process", which was published in "Waste Materials in Construction" (Proceedings of the International Conference on Environmental Implications of Construction with Waste Materials, Maastricht, Netherlands, 10th–14th Nov. 1991, edited by Goumans, van der Sloot and Aalbers).

This method is, however, applicable only to fly ash. To produce a slag having useful pozzolana reaction properties or hydraulic reaction properties, it is necessary to add limestone and, if appropriate, alumina or another alumina-containing compound, because the fly ash contains too high a proportion of silica and/or silicates for the production of the desired reaction properties. On the other hand, fly ash does not cause a particular problem which occurs with relatively heavy refuse incineration products such as, for example, grate throw-off and siftings, namely that such refuse incineration products still contain considerable quantities (for example up to 5% by weight) of organic waste materials which have been incinerated only partly or not at all. Thus, this method known from the article by Lamers only incompletely solves the problem of the disposal of refuse incineration products.

With a view to complete combustion of the refuse incineration products, the oxidation of molten metallurgical waste products by blowing oxygen-containing gas into the melt through a lance, as is known, for example, from WO-91/02824, can be considered. In this method, however, reducing conditions always apply in the melt, with the exception of the surroundings of the lance. This method fulfills the purpose of causing volatile elements and their compounds to escape in a gas phase and then precipitating and/or washing them out of the latter, but other elements and their compounds are collected in the slag and render the latter toxic or at least in acceptable within the scope of the regulations which will be discussed below.

The disposal of refuse incineration products and/or analogues causes extreme concern in all industrial countries. The refuse incineration products can generate toxic gases and eluates, and the products from the incineration of hazardous waste are certainly toxic. While an increasing volume of toxic products arises, it becomes increasingly difficult to store the rising volume of toxic products in suitable landfills. The problem arises above all in the disposal of highly toxic substances containing sulphur compounds and/or halogen compounds.

In a typical refuse incineration plant of an average-sized town such as Zurich, about 300,000 to 400,000 tons of refuse have to be incinerated per year, about 350 kg of refuse incineration products being produced from 1,000 kg of refuse, and these comprise in turn about 300 kg of grate throw-off, about 40 kg of filter dusts and about 10 kg of products from the more elaborate flue gas purification. Hitherto, this slag has been freed of scrap and coarse organic substances as well as possible by simple mechanical means and, if appropriate after fractionation and/or stabilization with cement, used in road construction. However, more refuse incineration products arise than can be disposed of in road construction. Apart from this, the said manner of disposal of the refuse incineration products is not without concerns regarding pollution of tile environment.

The recent Swiss "Technical Wastes Regulations" in principle preclude the use of refuse incineration residues as building material, exceptions for construction purposes are permitted only with restrictions in connection with the construction of roads, squares and dams, and this use of the refuse incineration residues must be recorded in a kind of contaminated materials registry.

Refuse incineration residues which can be used as building material must in this case be of a so-called earth crust quality or rock quality, wherein the environmental pollution is substantially below that defined by the "Technical Wastes Regulations".

The detoxification of tile output of refuse incineration plants (refuse incineration products in tile form of solids and gases) has already been the subject of various proposals.

From DE-C-3,608,005, it is known, for the disposal of hazardous waste which contains toxic or environmentally harmful constituents or causes these to be formed in pyrolysis or incineration, first to pyrolyze the refuse at 500°–900° C. The gases thus generated are then passed together with an oxidizing agent such as air or steam through a melt, held at 1400°–1600° C., of iron or steel, copper, metal oxide or salt. Nickel, copper and arsenic dissolve in the iron melt as elements or compounds, and manganese and chromium collect in the oxidized form in the slag melt. Heavy metals which have a high vapor pressure at the melt temperature, for example lead, tin, zinc, cadmium and mercury, and also sulphur compounds and/or halogen compounds, escape with the gases which are then purified in such a way that, in addition to inert gases, they mainly contain hydrogen and carbon monoxide and can be used as fuel. As a result, the entire process can be operated largely without energy being supplied. The remaining toxic constituents are firmly fixed in the slag, so that these can be put into landfills without more stringent safety requirements, but nevertheless only in landfills, whereas a different use of the slag cannot be considered because of its toxic constituents. In this known method, however, the gases from the pyrolysis of the hazardous waste are subjected to a treatment, whereas no treatment of toxic slag from a conventional refuse incineration plant is proposed.

From EP-C-175,207, it is known, for the disposal of carbon-containing or organic hazardous waste, to introduce this into a hot fluid such as an iron-containing metal melt at a temperature of over 1000° C. and to add an oxidation gas in order to oxidize the refuse in the hot melt. After they have been detoxified, the gases generated contain, in addition to inert gases, mainly hydrogen and carbon monoxide. This known method is aimed at the complete destruction of hazardous organic substances such as dioxin, whereas no indication is given with regard to the elimination of metal or slag, which contain toxic constituents. From this method, it is known to contact the refuse with an iron melt, but in this known method it is the hazardous waste itself which is subjected directly to a treatment, whereas no treatment of toxic slag from a conventional refuse incineration plant is proposed.

From JP-A-54-78,866, it is known, for the disposal of hazardous waste, to introduce this into the slag of a converter and to add pulverized coal or spent oil and also an oxidation gas, in order to oxidize the refuse in the hot melt and to absorb the remaining ash in the slag melt. The gases generated contain, in addition to inert gases, mainly hydrogen and carbon monoxide. The slag melt is kept under reducing conditions, so that iron, calcium and phosphorus are removed from the slag and are precipitated below the latter as an alloy melt. This alloy melt is separated into an iron-containing fraction and a fraction which contains oxides of calcium and phosphorus. The iron-containing fraction can be used in steel manufacture and the calcium-phosphate-containing fraction can be used as fertilizer, while the slag is recycled. This known method is also directed to the complete destruction of hazardous organic substances, whereas no indication is given with regard to the elimination of metal or slag, which contain toxic constituents. From this method, it is known to contact the refuse with an iron melt, but in this known method it is the hazardous waste itself which is subjected directly to a treatment, whereas no treatment of toxic slag from a conventional refuse incineration plant is proposed.

From EP-C-162,215, it is known to use slag from the refuse incineration together with clinker in the manufacture of cement. The refuse is incinerated in hot exit air from the cooling of the cement clinker. In the hot gases thus generated at 1000°–1400° C., the raw cement meal is calcined, a part of these gases being taken off at the inlet of the clinker rotary kiln, in order to condense and to remove the volatile heavy metals therefrom. The slag from the refuse incineration is quenched in water; it has latent hydraulic properties and can be admixed to the cement. However, it is not ensured in this method that all toxic constituents have been removed from the slag, so that this slag may not be admixed to the cement without further measures in any desired application. In this known method, the slag from a conventional refuse incineration plant is thus further processed without regard for its compatibility with the environment, but no treatment of toxic slag from a conventional refuse incineration plant is proposed.

From BE-A-868,430, it is known to reduce basic slag from the oxygen treatment of cast iron to Portland cement. Alumina and silica are added to the slag melt and the atmosphere is made highly reducing, in order to reduce iron oxide and manganese oxide in the slag and to separate out a manganese-containing iron melt below the slag melt. After the reduction, lime is added to the slag in order to adjust the composition of the slag melt to that of Portland cement. Even in this method, however, it is not ensured that all toxic constituents have been removed from the slag, so that this slag may not be admixed to the cement without further measures in any desired application. With this known method, no treatment of toxic slag from a conventional refuse incineration plant is thus proposed.

Viewed as a whole, it is the object of the known methods mentioned above to produce refuse incineration residues which are in the form of granulated glass, which is resistant to leaching, and are then put into a landfill.

A method for processing refuse incineration products, which are in the form of solids, to give products which are environmentally acceptable and can be used without reservations for building purposes and which are of earth crust quality or rock quality, as is strictly defined in the "Technical Wastes Regulations", is thus not yet known.

OBJECTS OF THE INVENTION

It is therefore an object of the invention to propose a method for processing mainly inorganic refuse incineration products polluted by heavy metals and/or heavy metal compounds, and/or analogues of such products, wherein the substances collecting in a slag are processed to give an environmentally acceptable product having latent hydraulic and/or pozzolana properties, which environmentally acceptable product can be used as a high-grade mineral binder, for example for mixed cements, and can, and also may, be added, for example, to the cement and/or concrete without further measures in any desired application because it gives a raw material for building purposes and/or a building material which causes no concerns regarding the environment even in accordance with the Swiss "Technical Wastes Regulations".

SUMMARY OF THE INVENTION

To achieve this object, a method of the type mentioned at the outset is characterized according to the invention in that the entire melt present in the reactor is, before the reduction, first subjected to an oxidation with vigorous agitation by blowing in a gas containing oxygen and/or oxygen compounds until substantially all the metals and metal compounds present in the reactor have been converted to the oxide form.

During the oxidation step, the iron content of the melt present in the reactor can be adjusted by adding iron or an iron compound. At least at the end of the oxidation, the temperature of the melt present in the reactor can be kept above 1450° C. and preferably at about 1500° C.

In the reduction step following the oxidation step, iron oxide can also be at last partially converted to metal, and extractants can be introduced for a controlled fractional extraction of individual metals and for a sedimentation of a metal melt containing layers of the heavy metal melt or melts below the iron melt, it being possible for the metal melt to be fractionally taken off from the reactor. In this reduction step, the reduction can be effected by means of iron, which is preferably in the form of scrap, and/or by means of a part fraction of the refuse incineration product and/or by means of hydrogen, and subsequently a reducing aftertreatment can be carried out by adding aluminum and/or calcium and/or ferrosilicon.

The quenching of the molten slag can be effected by heat exchange with a fluid, preferably with water, steam, air and/or oxygen, and the fluid heated in this heat exchange can be used for preheating not yet melted refuse incineration products and/or analogues, and a fluid already used for said preheating can preferably be used for said quenching.

In principle, various oxidizing agents such as, for example, oxygen, air, steam, carbon dioxide or even a burner flame adjusted to be oxidizing and the like can be used for carrying out the oxidation step. In principle, certain oxidic solids could also be used.

In principle, various reducing agents, such as, for example, hydrogen, carbon monoxide, methane or even a burner flame adjusted to be reducing and the like, and also so-called base metals, such as, for example, calcium, magnesium, silicon, aluminum, iron and the like or even an electrochemical reaction on a cathode can be used for carrying out the reduction step. In principle, certain solids, inter alia coal, graphite powder and the like, could also be used. The organics still present in the refuse incineration residues can also act as reducing agents.

By the method according to the invention, the refuse incineration products and/or analogues are melt-thermally treated under such redox conditions that they are provided with latent hydraulic properties and/or pozzolana properties while being depleted of pollutants (heavy metals, iron, chlorides, sulphates, organics).

Owing to its process steps of controlled oxidation and the subsequent controlled reduction of heavy metal compounds and at least partially of iron, the method according to the invention leads to the following advantages:

The method according to the invention is applicable to a variety of starting materials such as various slags, ashes, dusts, contaminated materials, spent catalysts, used glass, foundry sands, scrap metals, and the like;

Instead of products which have to be put into landfills, marketable products are produced, namely on the one hand a mineral binder of low pollutant content which can be used, for example, for mixed cements, and on the other hand at least one metal alloy which is highly enriched in heavy metals and contains the metals, inter alia iron, copper, zinc and nickel, initially present in the refuse incineration products and/or analogues, and from which valuable metals can be recovered;

The oxidation of the melt present in the reactor and the subsequent reactions such as, for example, the reaction of metal oxides with silicates, produces heat which contributes to heating and thus assists in optimizing the purely thermal energy requirement;

No significant quantities of gases other than those occurring in air escape from the plant.

BRIEF DESCRIPTION OF THE DRAWING

Embodiments of the invention are described below in more detail with reference to the drawing in which.

SPECIFIC DESCRIPTION

Figure 1:
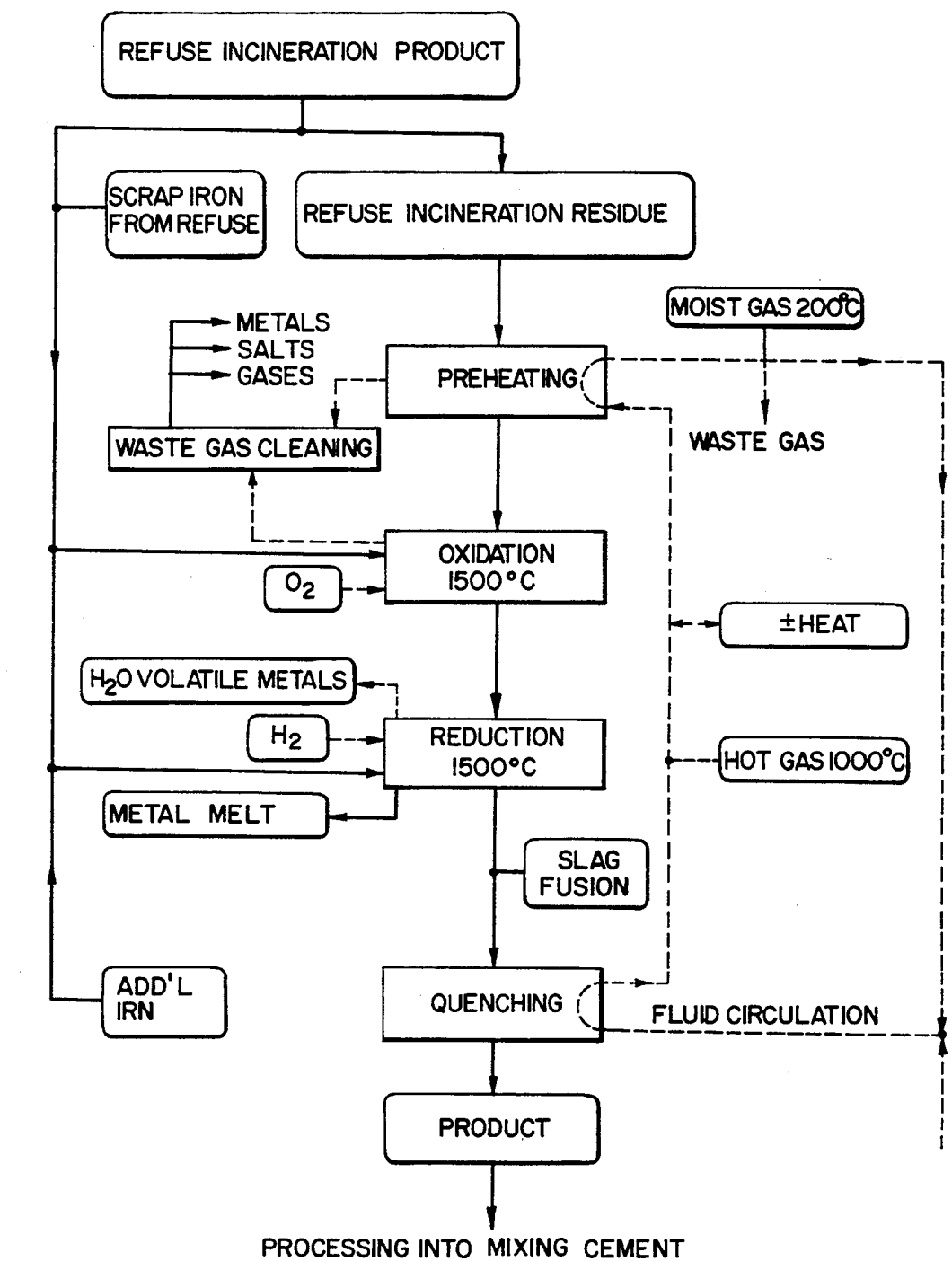
FIG. 1 shows a flow diagram as a schematic illustration of the method according to the invention.

A starting product, given here as an example, for carrying out the method according to the invention is a refuse incineration product such as is obtained, for example, on the grate of a refuse incineration plant at 600°–900° C. If this product is allowed to cool by itself, it does not acquire any latent hydraulic properties and/or pozzolana properties, nor is it homogeneous in most cases, in particular because it contains scrap iron. Usually, however, the hot refuse incineration product is cooled to about 80° C. by discharge in water and temporarily stored in a bunker, where it may cool down further. The moisture content of this cooled refuse incineration product is about 25% of water on discharge and can in the course of time reduce to 15–20% of water during the temporary storage in the bunker.

A typical refuse incineration product, such as arises on the grate of a refuse incineration plant, contains about 10% by weight of metallic iron and about 5% by weight of metallic aluminum. After discernible metallic constituents such as pieces of iron and aluminum have been removed from it, the composition of the refuse incineration residue thus obtained is, for example, approximately as follows:

| | | | |
|---|---|---|---|
| $SiO_2$ | 48.6% by wt. | Cd | 5.7 ppm |
| $Al_2O_3$ | 10.0% by wt. | Hg | 0.1 ppm |
| $Fe_2O_3$ | 5.5% by wt. | Tl | <1.0 ppm |
| CaO | 17.0% by wt. | Ni | 131 ppm |
| MgO | 2.8% by wt. | Cr | 450 ppm |
| $SO_3$ | 1.6% by wt. | Cu | 1285 ppm |
| $K_2O$ | 1.2% by wt. | Pb | 2334 ppm |
| $TiO_2$ | 1.0% by wt. | Sn | 197 ppm |
| $Mn_2O_3$ | 0.1% by wt. | Zn | 3025 ppm |
| $P_2O_5$ | 0.6% by wt. | | |
| Cl | 0.3% by wt. | | |
| F | 0.1% by wt. | | |
| Loss on ignition | 7.9% by wt. | | |
| Various to make 100 | 3.3% by wt. | | |
| C organic | 0.5% by wt. | | |
| $CO_2$ inorganic | 1.2% by wt. | | | pH 11.3

Compared with this, the "Technical Wastes Regulations" specify that, inter alia, the following values must be adhered to: Cd<50 ppm, Cu, Pb, Ni<500 ppm, Zn<1000 ppm.

The high loss on ignition of the above refuse incineration residue fraction is mainly caused by the hydroxides formed from water (moisture content), which is confirmed by the high pH of more than 11. The concentration of copper, lead and zinc exceeds the limit specified by the "Technical Wastes Regulations".

The fundamental idea of the method according to the invention is to control the redox behavior of the refuse incineration residue on the one hand by means of an oxidizing agent and on the other hand by means of a reducing agent. This leads to a significant reduction in the content of heavy metal compounds in the processed slag. In the best case, no supply of thermal energy is necessary. If oxygen is used for the oxidation, no substantial gas quantities escape from the plant.

In a first phase, the refuse incineration residue is oxidized. In the course of the increase in temperature, the solids mixture gradually melts at about 1000° C. The metallic iron present in the melt thus formed is at the same time oxidized initially to hematite:

$$4Fe + 3O_2 \rightarrow 2Fe_2O_3$$

1 ton of refuse incineration residue (100 kg of metallic iron) thus requires about 43 kg (30 m$^3$) of pure oxygen or 150 m$^3$ of air.

When the temperature is increased, hematite decomposes into magnetite and oxygen:

$$6Fe_2O_3 \rightarrow 4Fe_3O_4 + O_2$$

At a melt temperature above about 1300° C., magnetite decomposes to give wuestite and oxygen:

$$2Fe_3O_4 \rightarrow 6FeO + O_2$$

with suitable process control while carrying out these reactions in cascade, oxygen can be recycled, and the overall reaction is as follows:

$$2Fe + O_2 \rightarrow 2FeO$$

1 ton of melt (100 kg of metallic iron) then still requires only about 29 kg (20 m$^3$) of pure oxygen or 100 m$^3$ of air.

In a second phase, the heavy metal oxide compounds then formed, in particular those of Cu, Cd, Ni and Pb, are reduced in the melt in accordance with their free enthalpy of reaction:

$$CuO + H_2 \rightarrow Cu + H_2O \text{ or } CuO + Fe \rightarrow Cu + FeO$$

$$CdO + H_2 \rightarrow Cd + H_2O \text{ or } CdO + Fe \rightarrow Cd + FeO$$

$$NiO + H_2 \rightarrow Ni + H_2O \text{ or } NiO + Fe \rightarrow Ni + FeO$$

$$PbO + H_2 \rightarrow Pb + H_2O \text{ or } PbO + Fe \rightarrow Pb + FeO$$

The FeO formed immediately reacts exothermically with the silicate in the melt to form fayalite (incidentally, this reaction also applies to the oxidation sequence):

$$2FeO + SiO_2 \rightarrow Fe_2SiO_4$$

Starting from a maximum content of 2500 ppm of Cu, 12 ppm of Cd, 200 ppm of Ni and 5000 ppm of Pb in the melt, a requirement of 140 g (1.5 m$^3$) of hydrogen results for 1 ton of melt.

If, for considerations and reasons relating to concrete technology, the iron oxide content of the melt should additionally also be reduced, the hydrogen consumption increases correspondingly:

$$FeO + H_2 \rightarrow Fe + H_2O$$

At 15% by weight of FeO in the melt, this results in a requirement of 4 kg (47 m$^3$) of hydrogen for 1 ton of melt.

The specific heat capacity of the melt is about 1.5 kJ/kg/K, any possible exothermic reactions being disregarded. The enthalpy of vaporization of water is about 2700 kJ/kg. The melt contains about 10% by weight of metallic iron which is oxidized at 1500° C. to wuestite, the corresponding enthalpy of combustion being 6400 kJ/kg, and about 5% by weight of metallic aluminum having an enthalpy of combustion of 42000 kJ/kg. The available heat results from the combustion of these metals and that of the unburnt carbon. If the refuse incineration residue arising at the grate of the refuse incineration plant is used as the starting product, a significant excess of heat results. Under these circumstances, no energy is required for purely heating purposes.

During the preheating and heating of the melt up to the oxidation temperature, fractions of the metals Hg, Zn, Cd, Pb, Sn or their volatile compounds evaporate very rapidly. The remaining heavy metal compounds are reduced in the melt. Volatile metals, for example Zn and Pb, escape in the gas phase. The other molten reduced metals, for example Ni, Cu and iron, are insoluble in the slag melt, so that the individual molten metals or their molten alloys can readily be separated by sedimentation from the slag melt.

This sedimentation can additionally be promoted by an addition of extractants ("collecting agents") to the slag melt. In fact, the reduced metals being formed arise in the slag melt as finely disperse metal droplets which need a certain time to aggregate. In the presence of certain metal melt phases, in which the metals being formed during the reduction step are easily soluble, the desired aggregation of the finely disperse metal droplets is accelerated by the said metal phases effecting, in a manner of speaking, a liquid/liquid extraction. An example of a suitable extractant is metallic lead for the aggregation and alloying of copper, nickel, tin and zinc being formed in the reduction step, or iron for the aggregation of copper, nickel and tin being formed in the reduction step.

Moreover, the addition, controlled on the basis of the redox potentials, of such extractants permits the metals being formed in the reduction step to arise successively in the slag melt, so that they can be recovered fractionally in metal melt phases.

It should also be mentioned that a high chromium oxide content of the slag melt can be lowered, for example, via a total reduction of the iron oxides to iron, since chromium oxide is reduced in the slag melt only after the iron oxides.

A further possibility of removing chromium from the slag is to introduce also chlorine into the reactor during the oxidation step. Highly volatile chromium chlorides are formed from at least a part of the chromium, and these escape into the gas phase above the slag. The required chlorine can be introduced in the form of chlorine gas or chlorides or also of chlorinated compounds, in particular of chlorinated solvents such as, for example, trichloroethylene, into the reactor.

Figure 2:
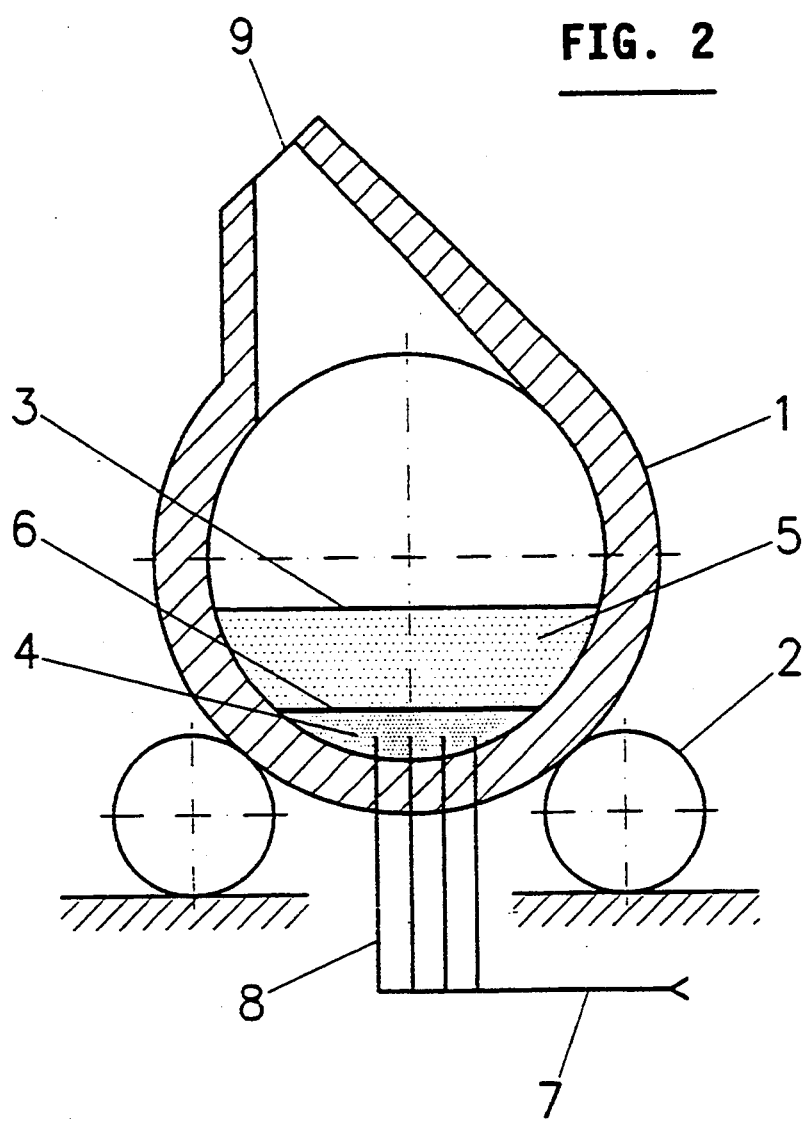
FIG. 2 shows a schematic representation of a converter during the execution of a process step of the method according to the invention, in longitudinal section.

The sequence, described below, of process steps is schematically illustrated in the flow diagram of FIG. 1. At the same time, a converter of the type used in the steel industry, heated by an electric arc, is shown in FIG. 2 as an example of a reactor suitable for carrying out the method. As described in more detail below, this converter is shown in FIG. 2 in a position in which a gas can be blown into the melt.

At the start of the method, the refuse incineration product arising in a conventional refuse incineration plant is fractionated into refuse incineration residue and coarse scrap iron. This process step can, if possible, already be carried out in the refuse incineration plant.

The refuse incineration residue thus obtained can be a residue which has cooled by itself and is then relatively dry, or a residue which has been cooled with water to about 80° C. and has been temporarily stored in a bunker and is then relatively moist. This refuse incineration residue is put into a suitable reactor, for example into the said converter which can be heated by an electric arc.

The coarse scrap iron separated from the refuse incineration residue is used for carrying out the process steps described below. If the quantity of scrap iron originating from the refuse is not sufficient by itself, additional iron, for example in the form of scrap, steel, cast iron, alloy and the like, and/or an iron compound in the form of one or more iron oxides can be added to the refuse incineration residue and/or to the melt in the reactor, in order to form a suitable melt of molten iron in the reduction step described below.

In a preheater upstream of the reactor, the refuse incineration residue fed is preheated for the purpose of energy recovery. The heat required for this purpose is in fact recovered at least partially by heat exchange between a fluid such as, for example, water, air and/or steam and the end product of the method, when this is quenched (as described below), since the fluid used for this purpose has a temperature of, for example, about 1000° C. after this heat exchange. Depending on the overall heat balance of the method, thermal excess energy can be taken from or supplied to this hot fluid, in order thus to maintain the required temperature conditions, which is indicated in FIG. 1 by the small box "±heat". The exit gases from this preheating of the refuse incineration residue are moist and emerge, for example, at about 200° C., are not toxic and can be discharged to the atmosphere, unless they are, for example, required for quenching the melt during the last step, already mentioned, of the method. The relevant fluid circulation is diagrammatically illustrated in FIG. 1.

In the next process step, the melt is oxidized, namely to such an extent that at least all the iron is oxidized. The oxidizing agent used is oxygen, but other oxidizing agents can also be used as already mentioned. The oxygen is, for example, blown from below through pipes into the converter, as is known in steelworks. During this oxidation, the enthalpy of combustion of the iron and aluminum is evolved, which gradually heats the reactor contents to, for example, about 1500° C. and causes them to melt. This process step is also of economic advantage since the complete removal of iron, which is expensive per se, from the refuse, becomes unnecessary. Moreover, the molten iron oxides act as a flux in the same way as, for example, CaO, which reduces the viscosity of the molten slag in an advantageous manner. The temperature of this process step is preferably above 1300° C., because the viscosity of the molten slag would be too high below this temperature. Temperatures above 1450° C., such as, for example, the temperature of about 1500° C. indicated above, are preferred at least at the end of the oxidation.

Gases containing heavy metal compounds escape from the preheater in the course of preheating and from the reactor in the course of the oxidation, as already described above. These gases are purified in order to recover the heavy metals, if appropriate to bind the sulphur compounds and/or halogen compounds, and to discharge only non-hazardous inert gases to the surrounding air. Appropriate gas purification processes are known per se and are therefore not described here in more detail.

In the next process step which is carried out essentially at the same temperature as the preceding oxidation step, the reactor contents are reduced, and in particular to such an extent that at least all the metals which are more electropositive than iron are converted from the oxide form to the metal, and the iron compounds are also at least partially reduced. Examples of such remaining metals are copper, zinc and nickel, in addition to iron itself.

In this reduction step, the already mentioned scrap iron, which has been separated from the refuse incineration residue, is used in the first place and the already mentioned additional iron in the second place, as reducing agent. As already mentioned, however, other reducing agents could also be used as reducing agents in this reduction step, at least as an additive, especially a part fraction of the refuse incineration product and/or hydrogen.

In the course of this reduction, iron is precipitated in the melt and collects below as an iron melt. Substantially all the remaining metals together collect in this iron melt in the form of an alloy thereof with the iron. Molten iron and the molten alloy are insoluble in the supernatant slag melt, so that the iron and the alloy readily separate by sedimentation from the slag melt, sinks and then collects in the lower part of the reactor.

If appropriate, extractants ("collecting agents") such as above all lead and then iron, copper and the like can be introduced to the reactor, as already mentioned, in order to accelerate the said sedimentation. If appropriate, different extractants can be introduced into the reactor successively, in order to cause the rising reduced metals to be formed on the basis of their redox potential, in order to obtain them fractionally.

In the case of a high chromium content of the refuse incineration residues used as starting material, it is possible, in addition to the chlorine treatment during the oxidation of the melt, as indicated above, to carry out, in the reduction of the melt, an aftertreatment by addition of metallic aluminum and/or calcium and/or ferrosilicon, in order to reduce this chromium also and to transfer it into the alloy melt. This aftertreatment is also a reduction and is therefore subsumed in the reduction step in FIG. 1.

The iron melt, that is to say the molten iron or the molten alloy, can be taken off from the reactor.

If, as mentioned, various metals have been added to the reactor, the metal melts sedimented successively and, if appropriate, in a plurality of layers based on the different radox potentials of these metals, can be taken off successively from the reactor, in order to give corresponding metal fractions.

The converter shown in FIG. 2 as an example of a reactor and heated by an electric arc can be tilted, in order to pour out first the slag melt and then the alloy melt. If the alloy melt is not taken off each time, that is to say after the treatment of each charge of refuse incineration residues in the reactor, but only the treated slag melt is taken off each time, an iron alloy highly enriched in heavy metals gradually collects in the lower part of the reactor, which alloy contains the metals initially present in the melt, inter alia iron, copper, zinc and nickel, and which can be processed further in an economically advantageous manner, in order to recover these metals.

The slag taken off from the reactor in the molten state is quenched and granulated. It has latent hydraulic properties and/or pozzolana properties and a sufficiently low pollutant content, so that it complies with the "Technical Wastes Regulations" applicable in Switzerland. Their use is unobjectionable in environmental respects. As the fluid for quenching this slag, a mixture of fresh air and moist air from the preheating can be used, as already indicated above and shown in FIG. 1. The quenching and granulation of the molten slag serves as a preliminary step in the processing of the refuse incineration residues to give a high-grade mineral binder of low pollutant content, which can be used, for example, for mixed cements and can be readily admixed to the cement and/or concrete in any desired application.

Briefly summarized, the method according to the invention produces three phases:
 a gas phase with, inter alia, the volatile ("atmospheric") metals, sulphur compounds and halogen compounds;
 a slag which is unobjectionable with respect to the environment and has latent hydraulic properties and/or pozzolana properties; and
 a metal phase, which may contain iron, with the non-volatile metals, if appropriate as separate fractions of individual metals.

In the operation of a converter as reactor for the method described, five successive process steps can be distinguished:
 charging of the refuse incineration residues to the preheater and preheating;
 oxidation of the refuse incineration residues, producing a melt;
 reduction of the melt and, if appropriate, aftertreatment to reduce the chromium;
 aggregation of the metal phase drops and precipitation thereof in the lower part of the converter, if appropriate in successive fractions; and
 separate take-off of the treated slag and of the metal phase from the converter, processing of this slag to give a mineral binder, processing of the metal phase, recovery of the heat.

In FIG. 2, the converter mentioned, which can be heated by an electric arc, is shown in longitudinal section in the position in which a gas can be blown into the melt, the process step in the same graphical representation being the oxidation or reduction of the melt in accordance with the preceding listing of process steps. The electrodes for the electric arc are not shown in FIG. 2, since they have been pulled out of the converter and removed during the process step shown.

The converter 1 is supported on the floor via a system of rollers 2 and is tiltably mounted. The converter 1 contains a melt which is marked 3 as a whole and consists of two phases: according to the method described above, the molten iron containing metal melt 4 has collected as the heavier phase in the lower part of the converter 1, with a supernatant layer 5 of molten slag as the lighter phase. An interface 6 thus forms between the metal melt 4 and the layer 5. A gas fed through the line 7 can be blown via a system of pipes 8 into this melt 3 in the form of a molten two-phase system. For a better illustration of the molten two-phase system, a rest state is shown in FIG. 2, in which no gas is blown in and the two phases 4 and 5 in the melt 3 can separate from one another and form layers one above the other to form the interface 6. If, however, gas is blown into the melt 3 via the system of pipes 8, the melt 3 is agitated in such a way that it is in the form of a dispersion so that no separate phases 4 and 5 are present or can be shown.

It can be seen from FIG. 2 that first the supernatant layer 5 of molten slag and then, if desired, also the metal melt 4 can be taken off through an opening 9 of the converter 1 by gradual tilting of the converter 1, for example by pouring into a suitable ladle for transport or into a suitable pipe for direct transfer to further processing. In this way, the supernatant layer 5 and the metal melt 4 can be separated from one another and be further processed separately.

The devices for intercepting the gases at the opening 9 of the converter 1 are known per se and are therefore not shown.

It is also to be understood that other embodiments of a reactor for carrying out the method according to the invention are possible, for example TBR converters, short-drum furnaces, LD crucibles, so-called KIVCET lead-smelting furnaces and other converters analogous to the Siemens-Martin furnaces such as are known from steelworks, and, for example, also glass-melting tanks and the like.

We claim:

1. A method for processing mainly inorganic refuse incineration products polluted by heavy metals present as metallic elements and/or by heavy metal compounds, and/or analogues of such products, to give environmentally acceptable products by melting and melt-thermal treatment of these refuse incineration products and/or analogues in a reactor, if appropriate after drying and/or preheating thereof, said method comprising the steps of
 providing a melt of said refuse incineration products in said reactor, said melt comprising metallic elements and metal compounds including heavy metals, said metallic elements including iron and metallic elements soluble in iron, said melt further comprising elements and compounds insoluble in iron, part of said elements and/or compounds comprised in said melt being volatile under temperature conditions of the melting and melt-thermal treatment,
 first subjecting the entire melt present in the reactor to an oxidation with vigorous agitation by blowing in a gas containing oxygen and/or oxygen compounds until substantially all metallic elements and metal compounds present in said melt in the reactor have been converted to a respective metal oxide form and particularly all iron has been converted to iron oxide, and then reducing said metal oxide form until at least all metals thereof which are more electropositive than iron are converted from the oxide form to a metallic element form the volatile metallic elements and metal compounds being allowed to escape in a gas phase and then being precipitated and/or washed out of the latter, said iron and metallic elements soluble in iron being collected in the reactor in an iron melt, said elements and compounds which are insoluble in iron being collected in a slag melt in the reactor above the iron melt and/or in at least one heavy metal melt below the iron melt and then being separated from the iron melt, and the molten slag taken off from the reactor being quenched in order to obtain pozzolana reaction properties or hydraulic reaction properties.

2. The method according to claim 1, wherein the iron content of the melt present in the reactor during the oxidation step is adjusted by adding iron or an iron compound.

3. The method according to claim 1, wherein the temperature of the melt present in the reactor is kept above 1450° C., at least at the end of the oxidation.

4. The method according to claim 3, wherein the temperature of the melt present in the reactor is kept at about 1500° C., at least at the end of the oxidation.

5. The method according to claim 1, with an additional step of partially converting iron oxide to metal in the reduction step following the oxidation step.

6. The method according to claim 1, with an additional step of introducing extractants for a controlled fractional extraction of individual metals and for a sedimentation of a metal melt containing layers of the heavy metal melt or melts below the iron melt in the reduction step following the oxidation step.

7. The method according to claim 6, wherein the metal melt is fractionally taken off from the reactor.

8. The method according to claim 1, wherein the reduction in the reduction step is effected by means of iron.

9. The method according to claim 1, wherein the reduction in the reduction step is effected by means of a part fraction of the refuse incineration product.

10. The method according to claim 1, wherein the reduction in the reduction step is effected by means of hydrogen.

11. The method according to claim 8, with an additional step of carrying out a reductive aftertreatment by adding aluminum and/or calcium and/or ferrosilicon after the said reduction step by means of iron and/or a part fraction of the refuse incineration product and/or hydrogen.

12. The method according to claim 1, wherein the quenching of the molten slag is effected by heat exchange with a fluid, and the fluid heated in this heat exchange is used for preheating not yet melted refuse incineration products and/or analogues.

13. The method according to claim 12, wherein a fluid already used for said preheating is used for said quenching.

14. The method according to claim 8, wherein said iron effecting the reduction is in the form of scrap.

15. The method according to claim 12, wherein the heat exchange fluid is selected from water, steam, air and/or oxygen.

* * * * *